C. J. KLEIN.
ELECTRIC SWITCH.
APPLICATION FILED SEPT. 7, 1911.

1,203,746.

Patented Nov. 7, 1916.
3 SHEETS—SHEET 1.

Witnesses:

Inventor:
Charles J. Klein.

C. J. KLEIN.
ELECTRIC SWITCH.
APPLICATION FILED SEPT. 7, 1911.

1,203,746.

Patented Nov. 7, 1916.
3 SHEETS—SHEET 2.

Witnesses:

Inventor:
Charles J. Klein.

C. J. KLEIN.
ELECTRIC SWITCH.
APPLICATION FILED SEPT. 7, 1911.
1,203,746.
Patented Nov. 7, 1916.
3 SHEETS—SHEET 3.
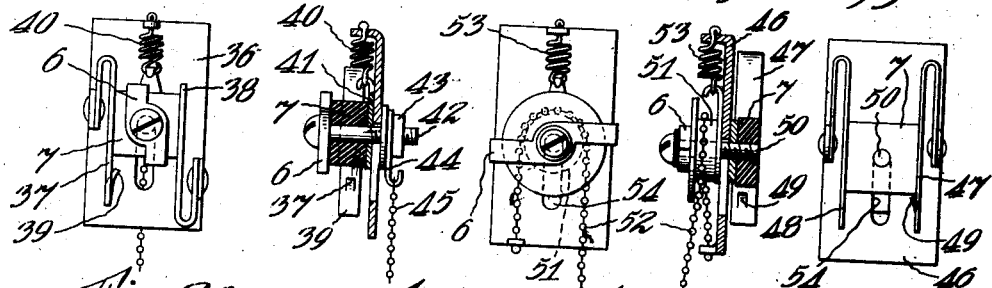
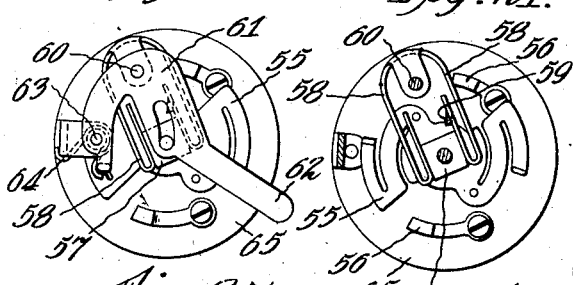 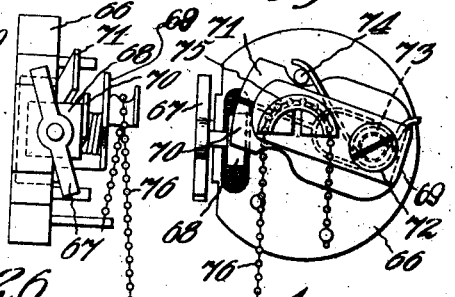
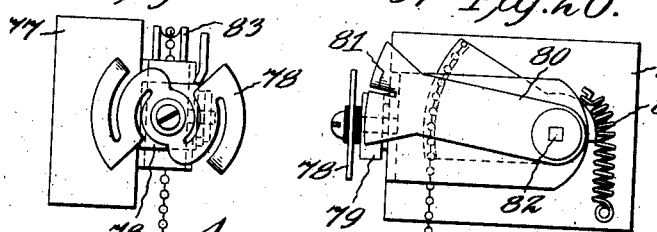 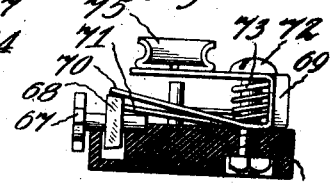
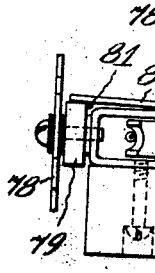 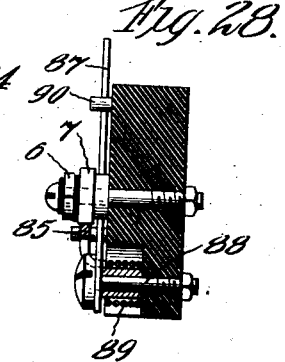 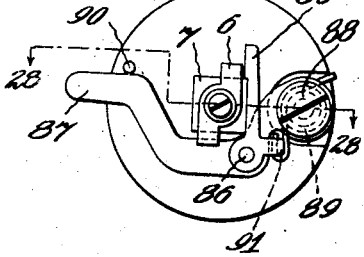
Witnesses:
Inventor:
Charles J. Klein.
By his Attorney

UNITED STATES PATENT OFFICE.

CHARLES J. KLEIN, OF MILWAUKEE, WISCONSIN, ASSIGNOR TO THE CUTLER-HAMMER MFG. CO., OF MILWAUKEE, WISCONSIN, A CORPORATION OF WISCONSIN.

ELECTRIC SWITCH.

1,203,746.

Specification of Letters Patent.     Patented Nov. 7, 1916.

Application filed September 7, 1911. Serial No. 648,035.

*To all whom it may concern:*

Be it known that I, CHARLES J. KLEIN, a citizen of the United States, residing at Milwaukee, in the county of Milwaukee and State of Wisconsin, have invented new and useful Improvements in Electric Switches, of which the following is a full, clear, concise, and exact description, reference being had to the accompanying drawing, forming a part of this specification.

My invention relates to electric switches.

One of the objects of my invention is to provide a simple and effective mechanism which may be used in snap switches in which a quick break or quick make and break is desirable, although it may also be used in various other useful ways.

Another object of the invention is to provide a simple, compact switch mechanism which may be manufactured economically and which is adapted for use in lamp socket casings and similar relations where the switch mechanism is inclosed in a protecting or ornamental casing, and where, consequently, compactness is very desirable.

A further object is to provide a switch mechanism which will effect a very quick make and break of the contacts, the desirability of which is well understood.

A further object is to provide a switch mechanism in which the circuit is broken at a point removed somewhat from the surfaces where the terminals are normally bridged by the circuit-closing member, whereby the injurious effects due to arcing, if any, do not impair the efficiency of the contacts when in normal operative position.

An additional object of the invention is to provide switch contacts which operate with a wiping action and hence are self-cleaning.

Other objects will be apparent from the description which follows.

The invention may be embodied in various forms. In the accompanying drawings I have illustrated several embodiments of the invention, which have assumed the form of electric snap switches. The invention is not limited however to the forms illustrated, as various other forms may be devised.

Figure 1:
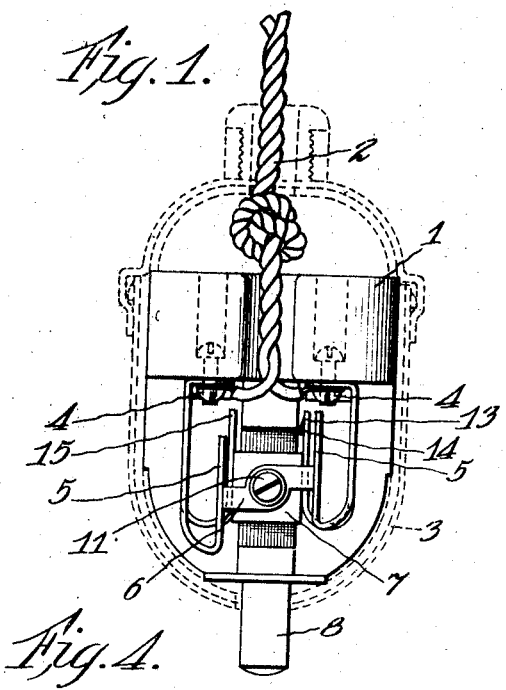
Figure 2:
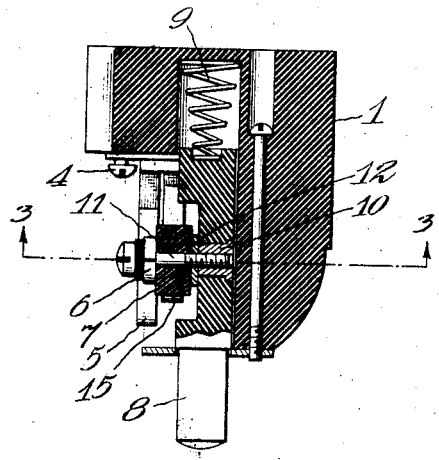
Figure 4:
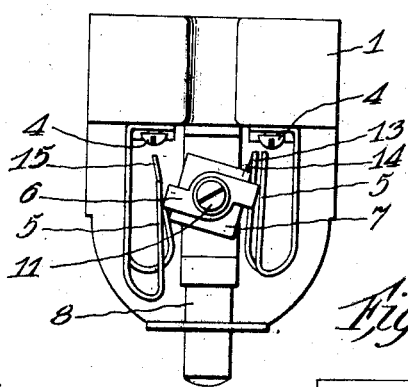
Figure 3:
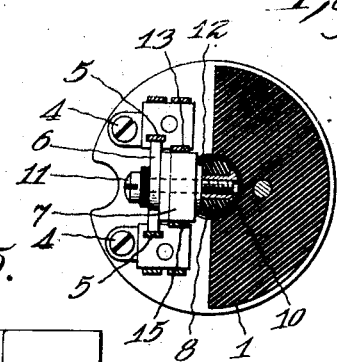
Figure 5:
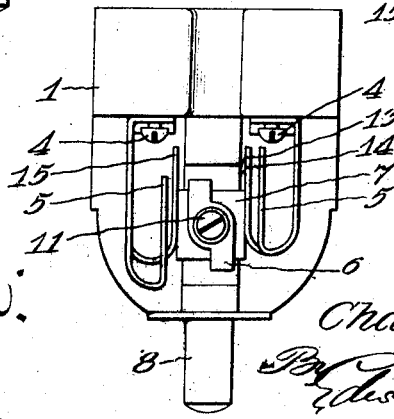
Figure 8:
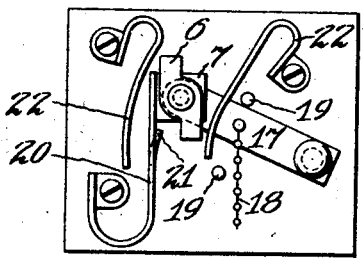
Figure 9:
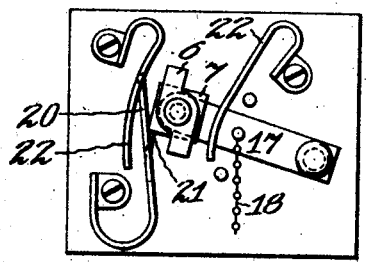
Figure 10:
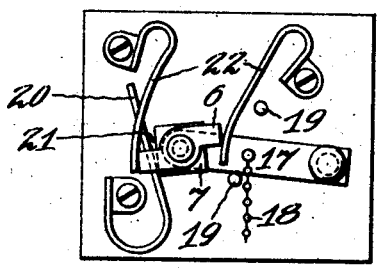
Figure 11:
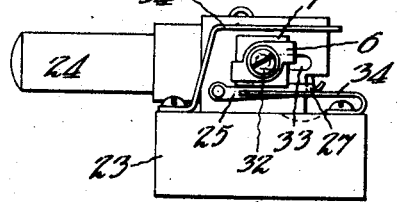
Figure 12:
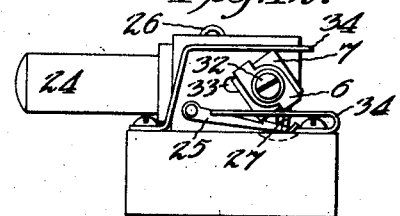
Figures 13, 14:
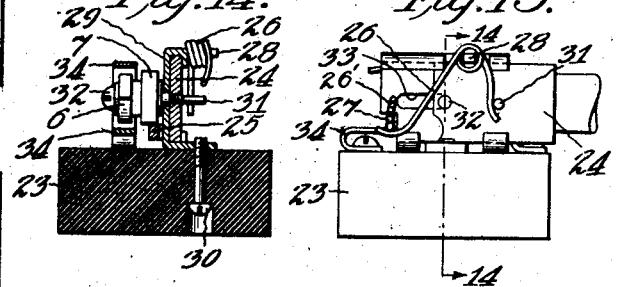
Figure 6:
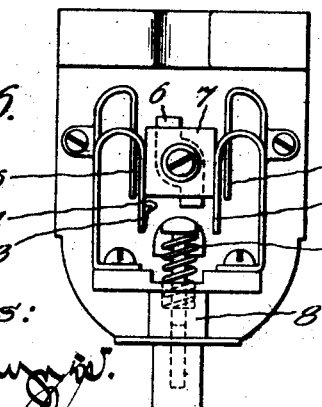
Figure 7:
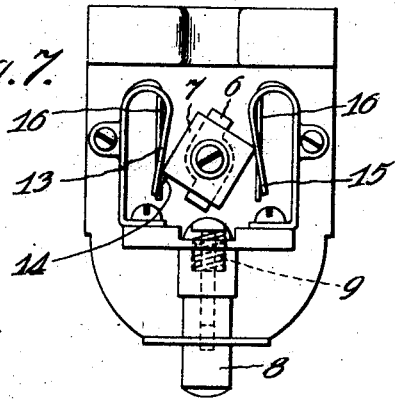

Referring to the drawings:—Figure 1 is an elevation of a pendant switch showing the switch contacts in closed position. Fig. 2 is a sectional elevation at right angles to Fig. 1. Fig. 3 is a section on the line 3—3 of Fig. 2. Fig. 4 is an elevation similar to Fig. 1 but with the switch contacts moved from the position shown in Fig. 1 to illustrate the operation of the device. Fig. 5 is a further elevation of the switch with the contacts in open position. Fig. 6 is an elevation of a form of pendant switch in which the relative relation of the actuating member and the operating member is reversed with respect to the relation shown in the preceding figures. Fig. 7 is a similar elevation showing the contact members in one of their intermediate positions. Fig. 8 is an elevation of a different form of switch adapted to be operated by a chain or cord. Fig. 9 is a further elevation showing the parts in one of the positions to which they are moved during the operation of the switch. Fig. 10 is a further elevation showing the parts after the contact member has snapped around into position to close the circuit. Fig. 11 is an elevation of a push-button type of switch. Fig. 12 is an elevation showing the relation of the parts in one of their intermediate positions. Fig. 13 is an elevation viewed from the opposite side to that shown in Figs. 11 and 12. Fig. 14 is a section on the line A—A in Fig. 13. Fig. 15 is an elevation of a form of switch adapted to be operated by a pull cord or chain. Fig. 16 is a longitudinal section thereof. Figs. 17, 18 and 19 are elevations of another form of pull cord switch. Fig. 20 is a top plan view of a form of switch adapted particularly for use in lamp sockets. Fig. 21 is another top plan view with certain parts removed. Figs. 22, 23 and 24 are views of a further form of lamp socket switch adapted to be operated by a pull cord. Figs. 25, 26 and 27 are views of a still further modified form of switch and Figs. 28 and 29 are a section and plan view of an additional modification.

The pendant switch illustrated in Figs. 1 to 5 inclusive, comprises a suitable base 1 of insulating material adapted to be supported in any suitable manner; for example by the knotted conductors 2, and preferably inclosed in a suitable casing 3. The ends of the conductors 2 are secured to suitable terminals, by means of the screws 4, 4. The circuit is adapted to be closed by bridging the resilient contact members 5 by means of a rotatable contact member 6. In the construction illustrated, the stationary members 5 have substantially parallel portions. The contact member or bridging member 6 may be moved back and forth and still bridge these parallel members in any one of a number of positions. Said bridging member which may assume various forms, is mounted on an actuating member 7, preferably constructed of insulating material and square in outline. The actuating member may be constructed of any durable material however, and may assume various forms, preferably polygonal, that is, with a number of circumferential faces, the adjacent faces meeting at a considerable angle so as to form shoulders or projections. These faces as illustrated, are flat but need not be flat to insure successful operation. The actuating member is adapted to be rotated successively in one direction, step by step, and thereby throw the bridging member 6 alternately from open to closed position, rotating it also in one direction. It is apparent therefore, that said bridging member 6 need not be mounted directly on said actuating member, but may be associated therewith in various other ways so as to be actuated thereby. The actuating member, in addition to being rotatable, is adapted to be reciprocated or given a bodily movement back and forth by the push-button or rod 8 which latter is normally impelled to extreme lower position by the spring 9, but which may be moved inwardly against the action of the spring 9 by hand, whenever desired. In the construction illustrated, the push-button or rod 8 is constructed of insulating material and has seated therein a screw-threaded bushing 10 adapted to receive the metallic screw 11 which secures the bridging member 6 and the actuating member 7 thereto, whereby said push-button or rod acts as a support for these parts and carries the same. Suitable washers 12 are also provided.

In order to cause the partial rotation of the actuating block 7 and the parts carried thereby as said block is moved inwardly, an operating member 13 is provided, consisting preferably of a yielding member provided with a shoulder 14 which normally projects into the path of said movable actuating block. The operating member is illustrated as a strip of resilient metal formed integrally with one of the stationary contact members 5. As it has no electrical function it may, of course, be entirely independent of any contact, and it is herein illustrated as forming part of the contact member simply for the purpose of simplifying the manufacture of the device, said two members constituting a forked element held in place by a single screw, as illustrated. The other stationary contact member 5 is preferably provided with a similar resilient strip 15 which, however, has no shoulder. This second resilient strip is not essential but is advantageous in that it counteracts the side thrust of the opposing resilient strip 13 and furthermore, it accelerates the snap action hereinafter explained.

When the parts are in the position shown in Fig. 1, the circuit is closed, the rotatable contact member 6 bridging the relatively fixed contact members 5. In order to open the circuit, the push-button 8 is moved upwardly by hand. Accordingly the actuating member 7 is carried upwardly whereby one corner thereof is eventually obstructed by the projection 14. Hence the continued upward movement of said actuating member causes a partial rotation thereof, as will be apparent from Fig. 4. The resilient members 13 and 15 yield, being spread apart by the opposite corners of the block as the same begins to rotate. These members exert considerable pressure against the opposite corners of the block, however, and as a result of the lateral pressure by the member 13, the projection 14 is prevented from slipping over the corner of the block and continues to restrain the same as the block advances, until after said block has passed the dead center, i. e., until after it has completed one-half of its quarter turn. During the partial rotation of the block and until it has passed the dead center, the bridging member 6 is still in contact with the stationary contact members 5, the circuit thereby remaining closed, although these members are spread apart somewhat, as shown in Fig. 4. As soon as said block has passed the dead center, however, the lateral pressure of said resilient strips 13 and 15, causes the block 7 to snap ahead, said members springing suddenly inward and pressing against opposite faces of the block. This sudden completion of the partial rotation of the block, causes the bridging member 6 to snap suddenly to vertical position, thereby opening the circuit with a quick action which effectively extinguishes whatever arc tends to be drawn. It should be further noted that the circuit is opened near the upper extremities of the relatively fixed contacts 5 and thereby whatever arcing occurs, takes place at this upper point and not from the surfaces that are normally bridged. See Fig. 1, in which the contact member 6 bridges the contacts 5 at a point considerably below their upper ends. As a result, any deterioration of the contacts 5, due to arcing does not affect the efficiency of contact normally made by the bridging member 6. This is a very important feature. Furthermore, as the bridging member 6 slides along the parallel portions of the contacts 5, a wiping action is secured, whereby the contact surfaces are self-cleaning. By virtue of these important features, the useful life of the switch is prolonged.

After the contact has been snapped to open position immediately following the position shown in Fig. 4, the push button 8 is released, whereupon it is restored by the spring 9 to normal lowermost position, the parts now appearing as in Fig. 5. It should be noted that the rotatable contact member 6 comprises two oppositely extending offset arms. The length of this contact, or in other words, its diameter is greater than the effective diameter of the block 7. The advantage of this increased diameter is that a longer arcing path is provided, as a given angular movement of the actuating block 7 results in a greater circumferential movement of the opposite ends of the rotatable contact 6. As illustrated in the drawings, the diameter of the rotatable contact is at least as great as the diagonal distance across the block 7. As a result of the relative diameters and as a result of the offset feature referred to above, the circuit remains closed by the contact members until the block has passed slightly beyond the dead center, after which said circuit is opened by a very abrupt movement thereof. Arcing is thereby substantially prevented.

Whenever it is desired to close the circuit, the push button 8 is again pressed inwardly, whereupon the previous cycle of operation is repeated, the bridging member 6, however, snapping to closed position this time, instead of to open position. Inasmuch as the block 7 is freely rotatable and the contact 6 secured thereto, to turn therewith, the snapping forward of said contact cannot be retarded after said block has once passed the dead center. In other words, after the push button has been pressed inwardly to the critical point, the operation is beyond the will of the operator. For example, by holding the stem 8 after the dead center has been passed, the operator cannot prevent the circuit from being opened with a quick snap action. This is an important feature as it prevents burning of the contacts by drawing an arc, as may be done in certain types of switches by careless operators, either purposely or otherwise.

It should be noted that the projection or shoulder 14 does not obstruct the forward movement of the actuating member as a whole, but simply retards a portion of the periphery thereof, thereby causing a partial rotation of said member to a point beyond the dead center, from which point said member completes its partial rotation independently of its prior engagement with said projection. In other words, the shoulder or edge of the block which was restrained by said projection, snaps ahead in the direction of rotation after the dead center is passed. After the snap action has occurred, the return of the actuating member to normal position with respect to the operating member 13, is effected by the independent spring 9. This return spring need not be an independent member however, as in certain forms of devices the operating member 13 may perform this function. Such a construction is described in connection with another figure.

In the above operation, it will be noted that the actuating member moves bodily with respect to the operating member. The relative action of the parts may be reversed, however, and in Figs. 6 and 7 I have illustrated such a reverse arrangement. In these figures the rotatable actuating member 7 is fixed as far as bodily movement is concerned and the actuating springs 13 and 15 move back and forth or reciprocate. The operation of this construction will be apparent from the above description. When the push button stem is pressed inwardly, the springs 13 and 15 slide upwardly along the opposite face of the actuating block 7 until the shoulder 14 engages one corner of said block and rotates the same beyond the dead center. See Fig. 7. After the dead center is passed, the block is snapped to open or closed position and the spring 9 may then return the parts to normal position, as seen in Fig. 6. In the construction just described, the stationary contacts 16 are preferably independent of the resilient operating members 13 and 15 as the latter are mounted so as to move back and forth.

In Figs. 8, 9 and 10, I have illustrated a form of switch in which the actuating member or block is movable and the operating member is relatively fixed. The operating member has the additional function of acting as the return spring which restores the actuating member to normal position. The switch is illustrated as adapted to be operated by a pull chain or cord, although, of course, it may be operated by other suitable means. The switch mechanism is mounted on any suitable base or support. The rotatable switch contact 6 is suitably mounted on the actuating member or block 7 and both are carried by the pivoted arm 17 adapted to be moved from initial position by the pull-cord or chain 18. Suitable stops 19 limit the motion in both directions. The operating member assumes the form of a resilient strip 20 provided with a shoulder or catch 21 preferably struck up therefrom. The resilient strip 20 normally bears against one face of the actuating block 7 and thereby holds the arm 17 in upper position against the upper stop 19. When the arm 17 is pulled about its pivot by the chain 18, the actuating block 7 descends, sliding along the face of the resilient strip 20 in the manner previously described. The projection 21 catches the corner of the block as shown in Fig. 9, whereupon the continued movement of said block causes it to be snapped around by said resilient member 20 in a manner that will be clearly understood from the preceding description. As the actuating block is snapped around to the position shown in Fig. 10, the rotatable contact 6 is adapted to either close the circuit by bridging the fixed contact members 22 or to open said circuit. As the pull on the chain 18 is released, the parts are restored to normal position as shown in Fig. 8, except that a different face of the block 7 is in contact with the resilient strip 20. It should be noted that as the arm 17 is moved downwardly, it puts the resilient strip 20 under additional tension, so that not only is it adapted to effect the snap action described, but it also forces said arm 17 back to normal position and thereby performs the double function of an operating member and return spring.

In Figs. 11, 12, 13 and 14, I have illustrated a form of switch which is very compact and adapted for use in a lamp socket for example, although, of course, it may be used in other ways. The switch mechanism is mounted in a suitable base 23 which is preferably shaped to conform to the lamp socket casing, or other environment. The actuating member or block 7 is adapted to reciprocate and to be snapped around to successive angular positions each time it moves forward. The block 7 and the rotatable contact member 6 are suitably mounted on the actuating stem 24 so that they may be moved back and forth in the described manner. As the block 7 is moved forward each time, one corner is engaged by the yielding catch 25. This catch is normally impelled against the block 7 by the spring 26, shown in Figs. 13 and 14, one end of said spring engaging one of a series of notches 26' in the inwardly turned end 27 of the yielding catch 25. The tension of the spring may be adjusted by moving said end from one notch to another. The spring is coiled about the projecting pin 28 which constitutes a fixed support therefor, being preferably struck up from the supporting frame 29, secured to the base 23 in any suitable manner for example, by the screws 30. The other end of said spring bears against the pin or lug 31 projecting from an enlarged portion of the stem 24. Said stem is thereby held in normal position but may be advanced against the action of said spring. As the stem 24 moves back and forth, carrying with it the actuating block 7, the screw 32 on which said block and rotatable contact are mounted, slides freely in the slot provided therefor. Each time the block 7 is moved forward, it snaps around a quarter of a revolution, due to the action of the spring-impelled catch member 25. The rotation of the movable contact 6 closes or opens the circuit by bridging the resilient fixed contact members 34, as will be apparent. The spring 26 acts not only as the resilient means for causing the snap action of the block 7, but it also restores the parts to normal position by acting against the pin 31. It will be apparent from Fig. 13 that as the pin 31 moves to the left, the spring 26 will be put under increasing tension and therefore it will exert a maximum upward pressure on the end 27 of the lever 25 at exactly the right time to obtain the most effective snap action, and that when the parts are in normal position, the upward pressure on said end is a minimum.

In Figs. 15 and 16, I have illustrated a simple form of switch mechanism mounted on a base plate 36. The rotatable contact member 6 is adapted to engage suitable fixed contacts not shown. The actuating block 7 is adapted to reciprocate between the spring members 37, 38 one of which is provided with a shoulder 39 to trip the block in the manner previously described. The block is normally held in extreme position by the spring 40 engaging the plate 41. The switch contact 6, block 7, plate 41, are suitably held together and secured to the base by a screw 42 and nut 43; the screw passing through a slot in the base plate. The plate 44 is also mounted on the screw 42 and has a hooked extremity from which depends the actuating chain 45. Of course, it is apparent that the back and forth movement may be produced by any suitable means other than the chain. The resilient members 37 and 38 are reversely mounted; that is to say, they are supported at diagonally opposite portions of the base, so that one of the extremities which bears against the block 7 extends upwardly and the other extends downwardly. By virtue of this arrangement, it will be apparent that as the block 7 begins to rotate, the two corners which bear against said resilient strips to spread them apart, are diagonally opposite each other as in the case of the forms previously described, but the pressure exerted on the resilient strips themselves is applied at points substantially the same distance from the point of support of each. In other words, the resilient strips each have the same leverage on the block 7 and therefore there is substantially no unbalanced force tending to thrust the block 7 to one side or the other and cause the screw 42 to bind in the slot in which it slides.

In Figs. 17, 18 and 19 I have illustrated a form of switch somewhat similar to that just described, but with the rotatable switch contact 6 on one side of the supporting plate 46 and the actuating block 7 on the reverse side thereof. The resilient strips 47 and 48 are also mounted on the reverse side of the base and one of them is provided with the projection 49 as in the previous forms. The switch contact and the actuating block are held together preferably by the scerw 50 which supports also the disk or pulley 51 over which the actuating chain 52 is looped. One end of the chain 52 is secured preferably to a stationary abutment, the other end being free to be operated. The parts are ordinarily held in one extreme position by the spring 53, but may be moved back and forth when the actuating chain is pulled and released, the screw 50, sliding in the slot 54. By having one end of the chain secured as shown, the back and forth travel of the switch parts is one-half the travel of the end of the chain and therefore the effectiveness of the pull is doubled.

In Figs. 20 and 21 I have illustrated a form of switch adapted particularly for use in lamp sockets, although, of course, capable of other applications. The rotatable switch contact 55 is adapted to bridge the fixed contacts 56. The rotatable switch contact is associated with the actuating block 57 in any suitable manner. The block 57 is rotatably mounted and is adapted to be rotated by the back and forth oscillatory movement of the operating member 58 consisting of a substantially U-shaped resilient member having inwardly turned parallel ends, one of which carries the shoulder 59 for engaging the corner of the block. The U-shaped member 58 is pivotally supported at 60 by the plate 61, having an extension or handle 62 and pivoted at 63. When the handle 62 is oscillated back and forth, the operating member 58 is also moved back and forth and the block 57 thereby rotated one step at a time. The pivoted connection 60 moves in the arc of a circle, the free ends of the U-shaped member 58 being guided by the relatively stationary block 57. The plate 61 is normally held in extreme position by a suitable spring 64. The various parts described are mounted on a suitable disk or block 65 which may be mounted in a lamp socket casing if desired, with the handle 52 projecting through said casing, or it may be otherwise employed.

In Figs. 22, 23 and 24, I have illustrated a further form of switch mechanism suitably secured to a base 66. The rotatable contact 67 is adapted to coöperate with suitable stationary contacts not shown. The actuating block 68 is preferably mounted adjacent said switch contact. Said block is caused to rotate by the oscillatory movement of the resilient plate 69 which is subscantially U-shaped as shown in Fig. 24. One of the arms of the U-shaped member is preferably bifurcated, whereby the two resilient arms 70 and 71 are provided. The arm 70 normally slides back and forth in contact with one of the faces of the block 68. The arm 71 is sprung into a different plane from the arm 70 and forms the obstruction or shoulder which engages the corner of the block to rotate the same. The member 69 is pivotally supported by the screw bolt 72 having a spring 73 associated therewith and adapted to hold said member in normal position against the fixed stop 74. The member 69 is provided with a chain guide 75 mounted on its other arm and may be moved back and forth about its pivoted support by means of the chain 76 or by other suitable means.

Figs. 25, 26 and 27 illustrate a further form of electric switch. The switch elements are mounted on a suitable base 77. The rotatable contact 78 may be of any suitable form and coöperate with stationary contacts not shown. The general operation of the switch is somewhat similar to the form just described, the actuating block 79 being rotated by the back and forth movement of a resilient member 80 having a shoulder 81 struck up therefrom and being pivotally supported at the other end. The resilient plate or member 80 is mounted on the squared shaft 82 and is operated by a chain guide member 83, also secured to said squared shaft. The spring 84 holds the parts in normal position. The detailed operation will be obvious in view of the preceding descriptions.

In Figs. 28 and 29 I have illustrated a further form of electric switch. In this form the rotatable contact 6 is mounted adjacent the actuating block 7, the latter being stepped around by the pawl 85. The pawl is pivotally secured at 86 to the arm 87, which arm is pivotally secured by the screw 88. The coil spring 89 not only normally holds the arm 87 in extreme position against the stop 90, but it also engages the extension 91 on the pawl 85, thereby normally impelling said pawl against the actuating block, whereby said pawl may not only engage the corners of said block, but may snap against the face thereof to cause the snap action described above.

It is apparent that all of the foregoing embodiments of my invention were selected for the purpose of illustration only and the invention is not to be limited to said embodiments nor to the details thereof, as the various elements may be modified and arranged in different ways, the relative position of the parts may be reversed or suitable equivalents may be substituted. Furthermore the various forms illustrated need not be operated by the push buttons or chains shown in connection therewith as any suitable actuating means may be employed. I desire therefore, to include broadly suitable equivalent means for accomplishing the desired result and falling within the scope of the appended claims.

What I claim as new and desire to secure by Letters Patent is as follows:

1. In combination, two members having yielding engagement with each other and being relatively movable bodily, one of said members being also rotatable, and means for engaging and causing partial rotation of said rotatable member when said members are moved relatively, said rotatable member being so shaped that after partial rotation said other member causes further rotation.

2. In an electric switch in combination, a rotatable actuating member, a yielding member bearing against the periphery thereof, coöperating engaging means on said members whereby relative bodily movement of said members will cause the engagement of said means and thereby rotate said rotatable member and throw it ahead after a predetermined movement.

3. In an electric switch, in combination, a rotatable member having peripheral faces meeting at angles whereby corner shoulders are formed, a member having a catch, said members being relatively movable back and forth and one being biased toward the other, and means for causing such relative movement, said catch being arranged to engage one of said shoulders during said movement whereby said engagement causes a partial rotation of said rotatable member, and said biased member snapping against the other to complete said partial rotation.

4. In a snap movement, in combination, a rotatable member having peripheral faces meeting at an angle with each other whereby shoulders are formed, a projecting catch, means for causing a relative movement of translation of said elements, said catch being arranged to engage one of said faces during said relative movement whereby said engagement causes a partial rotation of said member, and a yielding device impelled toward said member which snaps against the aforesaid face after said partial rotation permits said face to be presented thereto.

5. A polygonal rotatable actuating member having substantially flat faces, a relatively reciprocable yielding member pressing against whatever face is adjacent thereto, and means associated with said yielding member adapted to engage said rotatable member and impart thereto a successive step by step rotation in one direction when one of said members is reciprocated relatively to the other, said yielding member being moved away from the axis of rotation of said actuating member at the beginning of each of said steps whereby it may snap inwardly at the end of each step and throw said rotatable member ahead.

6. In an electric snap switch, yielding contact members and a rotatable bridging member therefor, means for moving these elements bodily relative to each other, and means for rotating said bridging member during such relative movement.

7. In an electric switch, substantially parallel contact members, a rotatable bridging member therefor, and means for sliding one of these elements upon the other whereby said bridging member after closing the circuit, may slide to normal bridging position, thereby cleaning the contact surfaces.

8. In an electirc switch, a rotatable polygonal actuating block, a contact bridging member rotated thereby, a yielding member bearing against said block to snap the same beyond the dead center, and resilient contacts engaged by said bridging member, the latter being longer than the greatest diameter of said actuating block, and so disposed that said block passes the dead center before said bridging member opens the circuit.

9. In an electric switch, two yielding members normally equi-distant at all points, a rotatable polygonal block arranged between the same in contact therewith, said block and said members being relatively movable bodily, and a catch associated with one of said members whereby a corner of said block is engaged during said relative movement, causing a partial rotation of said block.

10. In an electric switch, a rotatable square actuating block, resilient strips pressing against opposite faces of said block said means being relatively movable bodily back and forth, one of said strips having a shoulder struck up therefrom to engage a corner of said block, whereby the latter is given a quarter rotation when the aforesaid parts are moved back and forth.

11. In an electric switch, a rotatable square actuating block, two resilient strips bearing against opposite faces thereof, a shoulder struck up from one of said strips, a contact bridging member associated with said block said strips and block being relatively movable bodily and a push button for causing said movement whereby said shoulder engages a corner of said block and snaps the same around to actuate said bridging member with a quick throw.

12. An electric switch comprising a square member movable back and forth, means causing the rotation of said member when moved, and switch contacts actuated by the rotation of said member.

13. In an electric switch, a rotatable member having substantially flat faces, means for moving said member bodily back and forth, an obstruction in the path of said member located so as to catch one corner thereof as it moves past and thereby cause a partial rotation thereof, said obstruction being yieldingly mounted to permit it to recede during said rotation and switch contacts actuated by rotation of said member.

14. In an electric switch, a rotatable member having substantially flat faces, means for moving said member bodily back and forth, an obstruction in the path of said member located so as to catch one corner thereof as it moves past and thereby cause a partial rotation thereof, said obstruction being spring-pressed against said member whereby it may recede therefrom and then snap back against the same and switch contacts actuated by rotation of said member.

15. In an electric switch, a rotatable member having substantially flat faces, means for moving said member bodily back and forth, an obstruction in the path of said member located so as to catch one corner thereof as it moves past and thereby cause a partial rotation thereof, said obstruction being yieldingly mounted to permit it to recede during said rotation and to restore it to initial position in the path of said member and switch contacts actuated by rotation of said member.

16. In an electric switch, a rotatable member having substantially flat faces, means for moving said member bodily back and forth, an obstruction in the path of said member located so as to catch one corner thereof as it moves past and thereby cause a partial rotation thereof, a device coöperating with one of said faces and put under tension by said partial rotation and switch contacts actuated by rotation of said member.

17. In an electric switch, a rotatable member having substantially flat faces, means for moving said member bodily back and forth, an obstruction in the path of said member located so as to catch one corner thereof as it moves past and thereby cause a partial rotation thereof, a device normally resting against one of said faces but moved radially away from the axis of said member by a corner thereof during said partial rotation and biased toward said member whereby it may snap against the next successive face after said corner has passed mid position and switch contacts actuated by rotation of said member.

18. In an electric switch, a rotatable member having substantially flat faces, means for moving said member bodily back and forth, an obstruction in the path of said member located so as to catch one corner thereof as it moves past and thereby cause a partial rotation thereof, a device normally resting against one of said faces but moved radially away from the axis of said member by a corner thereof during said partial rotation and biased toward said member whereby it may snap against the next successive face after said corner has passed mid position, a spring for restoring the rotatable member to normal position with respect to said obstruction and switch contacts actuated by rotation of said member.

19. In combination, coöperating switch contacts adapted to open and close a circuit and a rotatable actuating block of square outline for operating the movable switch member, means for moving said block bodily back and forth, a resilient member bearing against one of the faces of said block and provided with a shoulder whereby when said block is moved in one direction, said shoulder engages one corner of said block and retards the same whereby continued movement of said block as a whole results in a partial rotation thereof.

20. In combination, coöperating switch contacts adapted to open and close a circuit and a rotatable actuating block of square outline for operating the movable switch member, means for moving said block bodily back and forth, a resilient member bearing against one of the faces of said block and provided with a shoulder whereby when said block is moved in one direction, said shoulder engages one corner of said block and retards the same whereby continued movement of said block as a whole results in a partial rotation thereof, said resilient member snapping down against the next adjacent face of said block after the same has moved beyond the dead center whereby a quick throw is imparted to said block and said movable switch members.

21. In combination, fixed contacts and a rotatable contact adapted to bridge the same to close a circuit, a rotatable square block with which said rotatable contact is associated, means for mounting said block for reciprocatory movement whereby said rotatable contact may slide relatively to said fixed contacts without breaking the circuit, and a yielding member adapted to bear against one of the faces of said block and having sliding engagement therewith and provided with a projecting shoulder whereby as said block is moved along said yielding member one corner is caught by said shoulder and the block turned until said yielding member snaps against the next successive face of said block thereby separating said fixed and movable contacts with a quick snap movement.

22. In an electric switch, substantially parallel resilient contact members, a rotatable bridging member between said contact members, means for moving said bridging member back and forth in contact with said contact members whereby the circuit may remain closed during such movement and a tripping device associated with said bridging contact for suddenly rotating the same near the end of its movement in one direction.

23. In an electric switch, relatively fixed contact members and a rotatable bridging member therefor having a normal bridging position, said bridging member being mounted to reciprocate in contact with said contact members whereby the circuit remains closed during said reciprocating movement in one direction, and means for rotating said bridging member to off position near the end of its movement, whereby the circuit is broken at a point away from the normal bridging position.

24. In combination, a reciprocable and rotatable contact bridging member, means whereby said member may be reciprocated, substantially parallel fixed members bridged by said member at a given position thereof, and means for rotating said bridging member to open the circuit at a different position in its travel whereby the arcing surfaces are removed from the normally bridged surfaces.

25. In a switch mechanism, a resilient element having a forked portion, a rotatable contact member engaged by one part of said forked portion to close a circuit and an actuating member coöperating with the other part thereof to impart a step by step rotation to said actuating member.

26. In a switch mechanism, a contact member having two tongues, said tongues being arranged in different planes, an actuating member coöperating with one tongue and a rotating contact coöperating with the other tongue, the latter tongue being farther from the axis of rotation than the former.

27. In a switch mechanism, relatively fixed contact members each comprising substantially U-shaped resilient strips, each of which is fixed to a suitable support at one end and having the free ends arranged parallel to each other to provide contact surfaces, a sliding bridging member between said ends and means for simultaneously sliding and rotating said member.

28. An electric switch comprising a suitable base of insulating material, stationary contact members secured to said base, each contact member consisting of two resilient tongues, a rotatable bridging member engaging one tongue of each contact member, an actuating member sliding back and forth between the other pair of tongues, said rotatable contact member and said actuating member being mounted on a common supporting pin, a push button carrying said pin, a spring normally holding said push button in extreme position, whereby said push button may be moved inwardly against the action of said spring to reciprocate said bridging member and said actuating member and a catch arranged in the path of said actuating member to partially obstruct movement of the same in one direction, whereby said member is partially rotated during each reciprocation, and whereby said rotatable contact member is also rotated to open and close the circuit.

29. In an electric snap switch, a rotatable actuating member for the switch contacts an operating member therefor, said actuating member being bodily movable along said operating member and means for moving said actuating member along the other.

30. In a push button operated switch, in combination, a contact actuating member rectilinearly movable and rotatable in a single plane and means for simultaneously moving said member rectilinearly and effecting accelerated rotation thereof independently of the rate of its rectilinear movement.

31. In a push button electric switch, in combination, a contact actuating member movable rectilinearly and rotatably in a single plane, means for moving said member rectilinearly, and means for effecting an automatic snap rotation of said member while moved rectilinearly at any speed.

32. In an electric switch, in combination, a rectilinearly movable operating member, a contact actuating member rotatably mounted thereon and bodily movable therewith, and means to rotate said latter member with an accelerated snap only when the same approaches its limit of bodily movement.

33. In an electric switch, in combination, a pair of parallel disposed yielding contacts, a rotatable square actuating member disposed therebetween and normally maintained with two of its sides parallel thereto, means to rotate said member in step-by-step quarter turns and at accelerated speed during the latter portion of each quarter turn, and a bridging contact carried by said member having its ends offset and projecting beyond the sides of said member adjacent diametrically opposite corners thereof whereby circuit is broken between said yielding contacts after said member is accelerated.

34. In a pendent socket pull switch, the combination of a shell and a semi-cylindrical insulating block having an integral flange at its upper end and switch mechanism carried by said block beneath said flange and an operating member passing through the lower end of said shell.

In witness whereof, I have hereunto subscribed my name in the presence of two witnesses.

CHARLES J. KLEIN.

Witnesses:
O. LARSEN,
A. E. MAAGE.